April 8, 1969  E. W. CAUFFMAN  3,437,192

MATERIAL DISTRIBUTING DEVICE

Filed March 20, 1967

INVENTOR.
EUGENE W. CAUFFMAN
BY
ATTORNEY

INVENTOR.
EUGENE W. CAUFFMAN
ATTORNEY

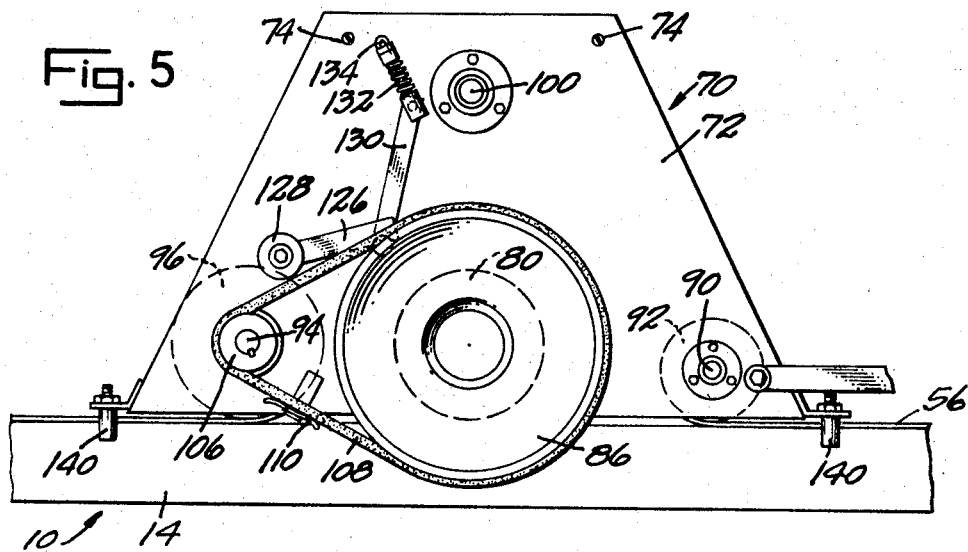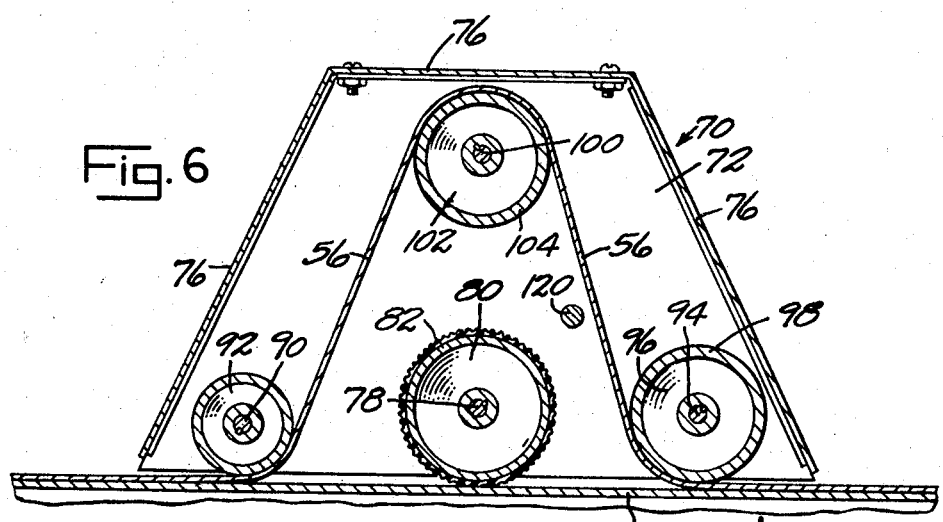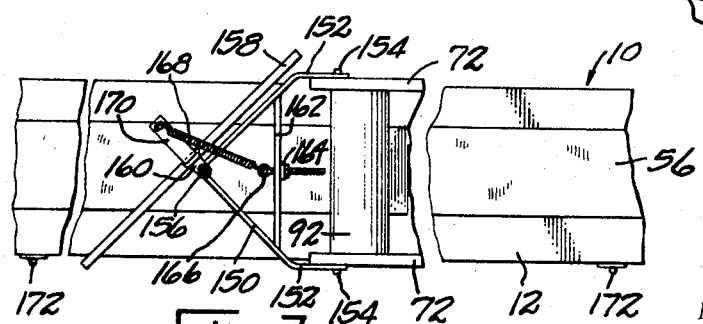

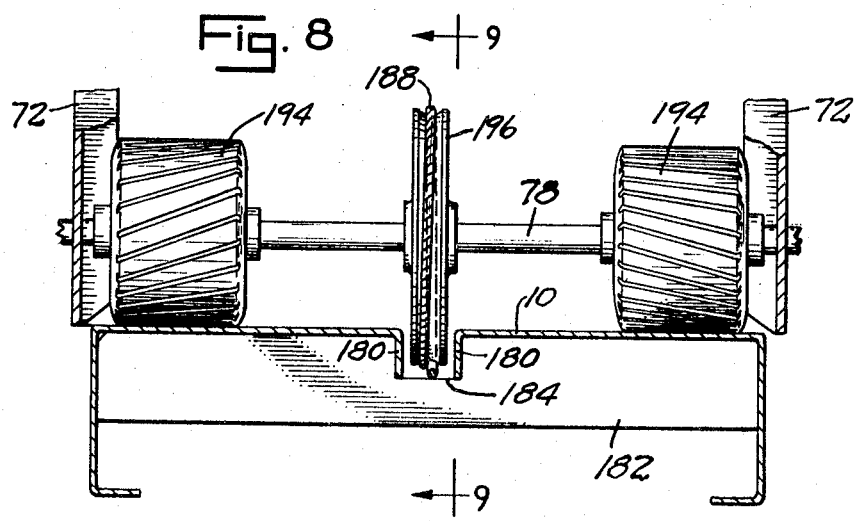
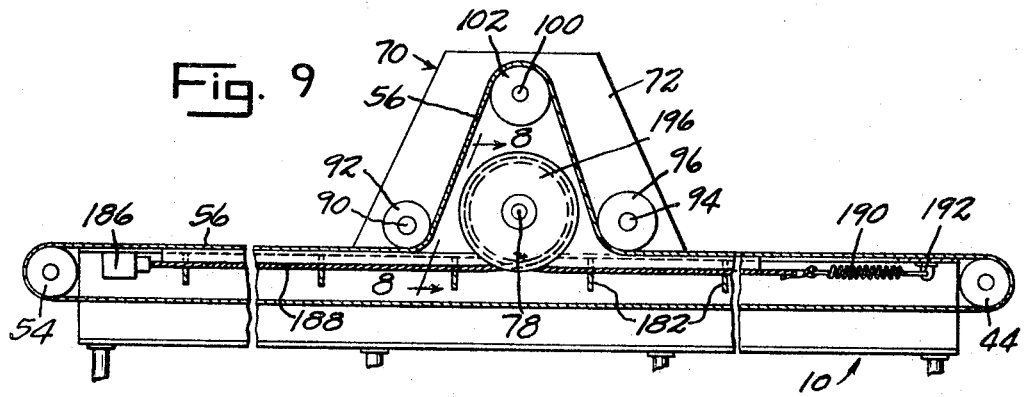
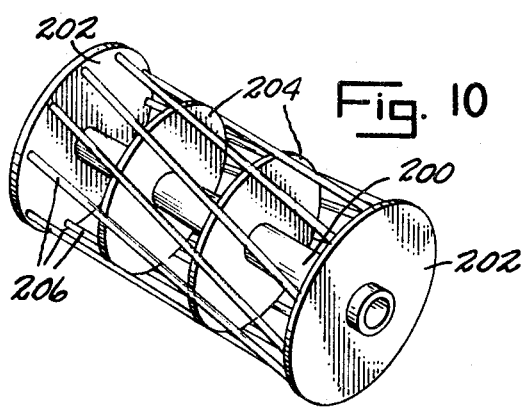
INVENTOR.
EUGENE W. CAUFFMAN

April 8, 1969 E. W. CAUFFMAN 3,437,192
MATERIAL DISTRIBUTING DEVICE
Filed March 20, 1967 Sheet 5 of 5
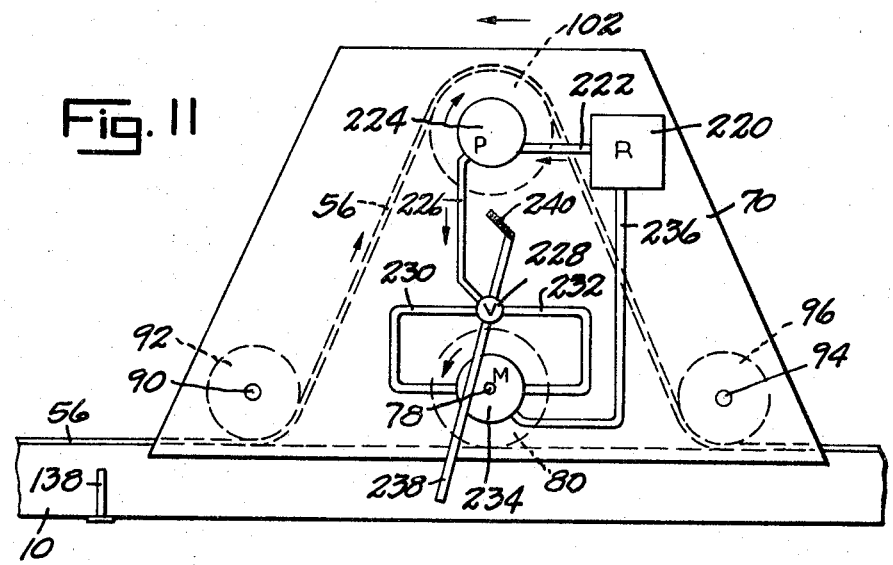
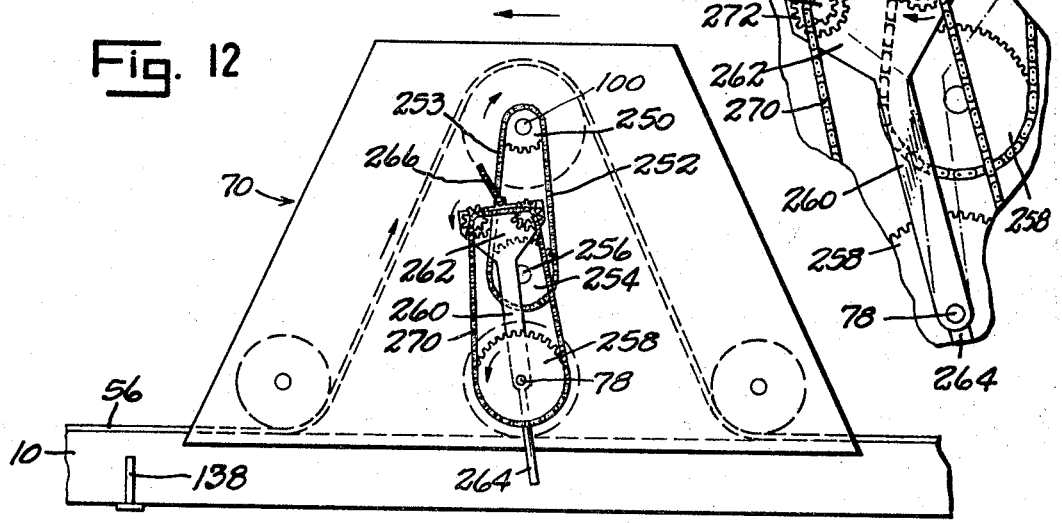
INVENTOR.
EUGENE W. CAUFFMAN
BY
ATTORNEY

United States Patent Office 3,437,192
Patented Apr. 8, 1969

1

3,437,192
MATERIAL DISTRIBUTING DEVICE
Eugene W. Cauffman, Claypool, Ind., assignor to Supreme
Augers, Inc., Silver Lake, Ind.
Filed Mar. 20, 1967, Ser. No. 624,396
Int. Cl. B65g 47/34, 33/04
U.S. Cl. 198—188                          23 Claims

ABSTRACT OF THE DISCLOSURE

A material distributing device having a table supported conveyor belt and a distributor unit for deflecting material laterally from said belt. The device has a drive means in which the conveyor belt is threaded to actuate it, said drive means being reversible by quick-throw means and moving at different speeds in different directions of travel. The unit includes a distributor plate swinging on a vertical axis to control the direction of material and swinging on a transverse axis to ride over surface irregularities of the belt.

---

This invention relates to improvements in material distributing devices and particularly to livestock feeding devices.

The uniform distribution of material from a storage means uniformly along an elongated zone of use, such as a long feeding bunk for livestock, a long baggage or luggage counter, or a long sorting and packing facility used in the handling of nuts, fruits or other articles, presents a number of problems. In all instances except the baggage handling problem, it has been common heretofore to use auger means for advance of the material being distributed from the storage means and along the distribution or use zone. Thus, in such cases, it has been common to provide a long trough in which an auger operates to propel material to discharge openings spaced along the length thereof and discharging to a feed bunk or other position of use.

Many problems have been inherent in an auger type of device, thus an auger constitutes a safety hazard to an operator during use and during repair of the device. An auger tends to separate the material being advanced, as between coarse and fine components thereof, with the result that there is a graduation of the material being discharged at different stations. Augers also have the disadvantage of breaking up, abrading or damaging the material being distributed, and present a hazard to animals when used in livestock feeding devices. Still other disadvantages of an auger type of distributor device are that its capacity of discharge is limited, its length of discharge is limited due to frictional resistance to the drive thereof, and it is also limited as to speed of travel. Augers also have a tendency to bind fibrous materials being advanced thereby, and they cannot handle efficiently either heavy material such as sand, coal or baled material, or light material such as straw, which will not remain in position to be propelled.

Because of the problems which exist with auger type distributing devices, some efforts have been made to provide distributing means using a belt to convey the material to be distributed. Various problems with belt conveyor types of distributors have been encountered. Thus, heretofore it has been necessary to provide separate drives for the conveyor belt and for the mechanism for discharging the material being conveyed by the belt. Another disadvantage of prior belt-type devices has been the need to provide expensive reversing controls for a distributor driving motor. In general, prior belt-type devices also have entailed high cost of construction, use of a large number of parts which are difficult to maintain and repair, low operating efficiency and a high operating cost.

It is the primary object of this invention to provide a novel and simple material distributing means for delivering uniformly along an elongated delivery area material which is conveyed or propelled alongside that area by a conveyor belt.

A further object is to provide a device of this character having a distributing means traversing a selected portion of the length of a conveyor run of a belt and having a driving connection with that conveyor belt for effecting movement of the distributor along the run in the direction in which the belt travels, but at a different speed than belt speed, and also movement in a direction counter to the direction in which the belt travels.

A further object is to provide a device of this character driven by a conveyor belt and traversing a run thereof, in which the speed of the device while traveling in the same direction as the belt is different than the speed of the device while traveling in a direction counter to the direction of belt travel.

A further object is to provide a simple mechanism for driving a material distributor and for reversing the direction of travel of the distributor at each end of a predetermined path of travel.

A further object is to provide a device of this character wherein a material distributor has a friction drive engagement with a belt-supporting table.

A further object is to provide friction drive means operative in each of two directions and which can be encased or enclosed for protection against the elements when used out-of-doors.

A further object is to provide a device of this character in which effective means is provided to protect against loss of light weight material due to high winds when used out-of-doors, and to protect livestock feeding at a trough or bunk into which the distributor discharges feed material from injury due to the movement of the distributing means.

A further object is to provide a device of this character which can change the direction of discharge therefrom upon each stroke of reciprocating movement, so as to provide uniform distribution of material at delivery zones at both sides of a reciprocating distributor path of travel along the conveyor belt.

A further object is to provide a device of this character wherein a distributor traversing one run of a conveyor belt mounts a distributor plate operative to deflect material from the belt to swing vertically so as to pass over belt lacings, and to swing laterally so as to change the direction of lateral discharge of material from the belt.

A further object is to provide a device of this character having novel means for guiding the movement of the distributor along a belt and a belt support.

Other objects will be apparent from the following specification.

In the drawings:

FIG. 5 is a side view of parts of the distributor in the driving position illustrated in FIG. 3, but viewed from the opposite side thereof, in the direction of the arrows 5—5 of FIG. 2.

FIG. 6 is a fragmentary longitudinal vertical sectional view taken along line 6—6 of FIG. 2.

FIG. 7 is a fragmentary top plan view of the device illustrating the material deflector plate unit.

FIG. 8 is a fragmentary vertical transverse sectional view of a modified embodiment of the invention, taken on line 8—8 of FIG. 9.

FIG. 9 is a longitudinal vertical sectional view taken on line 9—9 of FIG. 18.

FIG. 10 is a perspective view of a modified construction of belt-engaging roller.

FIG. 11 is a schematic view of a modified embodiment of drive direction control or reversing means.

FIG. 12 is a side view of another modified embodiment of drive direction control reversing means in one operating position.

FIG. 12A is an enlarged fragmentary view of the embodiment of FIG. 12 shown in another operating position.

Figure 1:
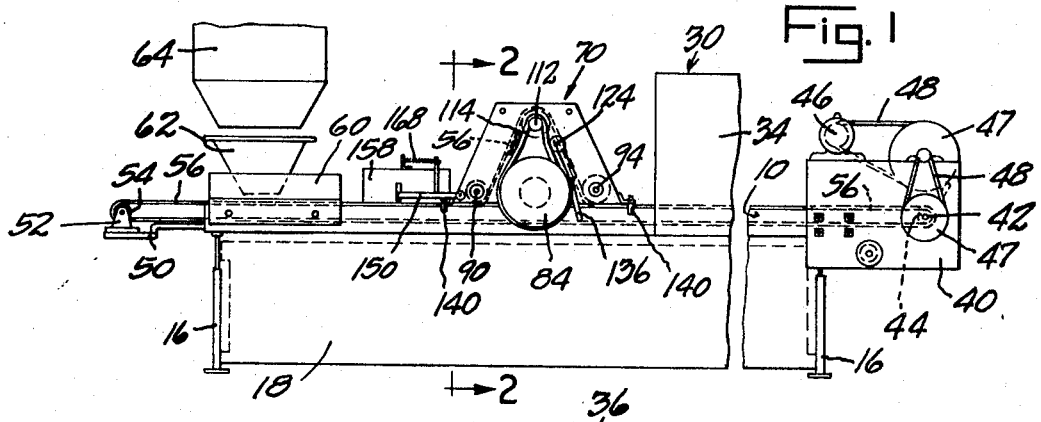
FIG. 1 is a fragmentary side view of a material distributor serving as a livestock feeder.

Referring to FIGS. 1 to 7, which illustrate one embodiment of the invention, the numeral 10 designates an elongated distributor table having a table top structure which preferably constitutes an inverted channel having a top panel 12 and shallow side panels 14. The table top unit is supported upon a leg structure or support 16 of any suitable height adapted to rest upon the ground or upon a building floor. A suitable longitudinal panel 18, as seen in FIG. 1, preferably extends full length of the table 10 therebelow and serves as a wind break.

At opposite sides of the leg structure 16, in the case of a livestock feeder, or at one side only thereof in the case of a luggage distributor or a distributor for other types of material, is located the receiving means onto which material from the table 10 is to be distributed, said receiving means being elongated and preferably extending for at least the major part of the length of the distributor table. In the construction shown in FIG. 2, the receiving means constitute elongated feed bunks, troughs, or receptacles, each having a bottom 20, inner and outer side walls 22 and end walls 24. Legs or other supports 26 position the troughs which are open at the top. Each trough is located somewhat below the level of the distributor table, with its inner wall 22 preferably located below and inwardly of one of the side walls 14 of the distributor table 10, so that any material which is deflected or pushed from the side of the table will fall into the trough. The troughs are of sufficient width to permit access thereto by animals in the case of a livestock feeder. It will be understood that troughs or other material receiving means will be constructed to satisfy the requirements of their intended use. Thus, the material receiving means of a device used as a luggage stand, or as a mushroom-growing container, or as a factory sorting and packing table, will vary according to the intended usage. In each instance, the receiving means will extend along the distributor table so as to receive items deflected or pushed from a side of the distributor table.

The distributor table may be protected by a cover 30, particularly in cases of livestock feeders or other uses out-of-doors. The cover is suitably supported by brackets 32 carried by and projecting laterally from the distributor table 10, preferably spaced above the receiving means 20, 26 and extending laterally outwardly from the table 10 a selected distance less than the width or the lateral projection of the receiving means 20, 26 beyond the table 10. In other words, access to the receiving means 20, 26 is provided laterally outwardly of the brackets 32 and the cover supported thereby. The brackets 32 are preferably located at the level of the bottom of the table top 12, and they support the side walls 34 and the top 36 of the cover. The cover provides means protecting the distributor table 10 and material thereon from the elements and from access thereto by animals. The cover also protects against undesirable access to moving parts accidentally by workmen. The cover is preferably readily removable, or it may include panels (not shown) for access to the table at selected points along its length. The cover may be of any selected length and preferably will extend for the major portion of the distributor table 10. It will be understood that the distributor table may be of any selected length, for example, it may be as short as 10 feet or greater than 100 feet in length.

At one end of the distributor table is mounted a conveyor drive supporting frame 40, preferably including spaced longitudinally projecting vertical plates between which extends a pulley shaft 42, mounting a belt pulley 44, so positioned that a projection of the top surface of the table top 12 is substantially tangent to the uppermost portion of the pulley 44. Conveyor drive means including a drive motor 46, and a drive transmission including pulleys or sprockets 47 and belts or chains 48 serves to effect a drive relation between the drive motor 46 and the belt driving pulley shaft 42. A suitable control for the conveyor drive (not shown), may be provided, it being understood, however, that the control need only be an on and off control switch in most instances, inasmuch as the motor 46 need rotate only in one direction. If desired, of course, means may be provided in the conveyor drive in the nature of a variable speed transmission or variable speed motor, if speed control variations are desired.

Figure 2:
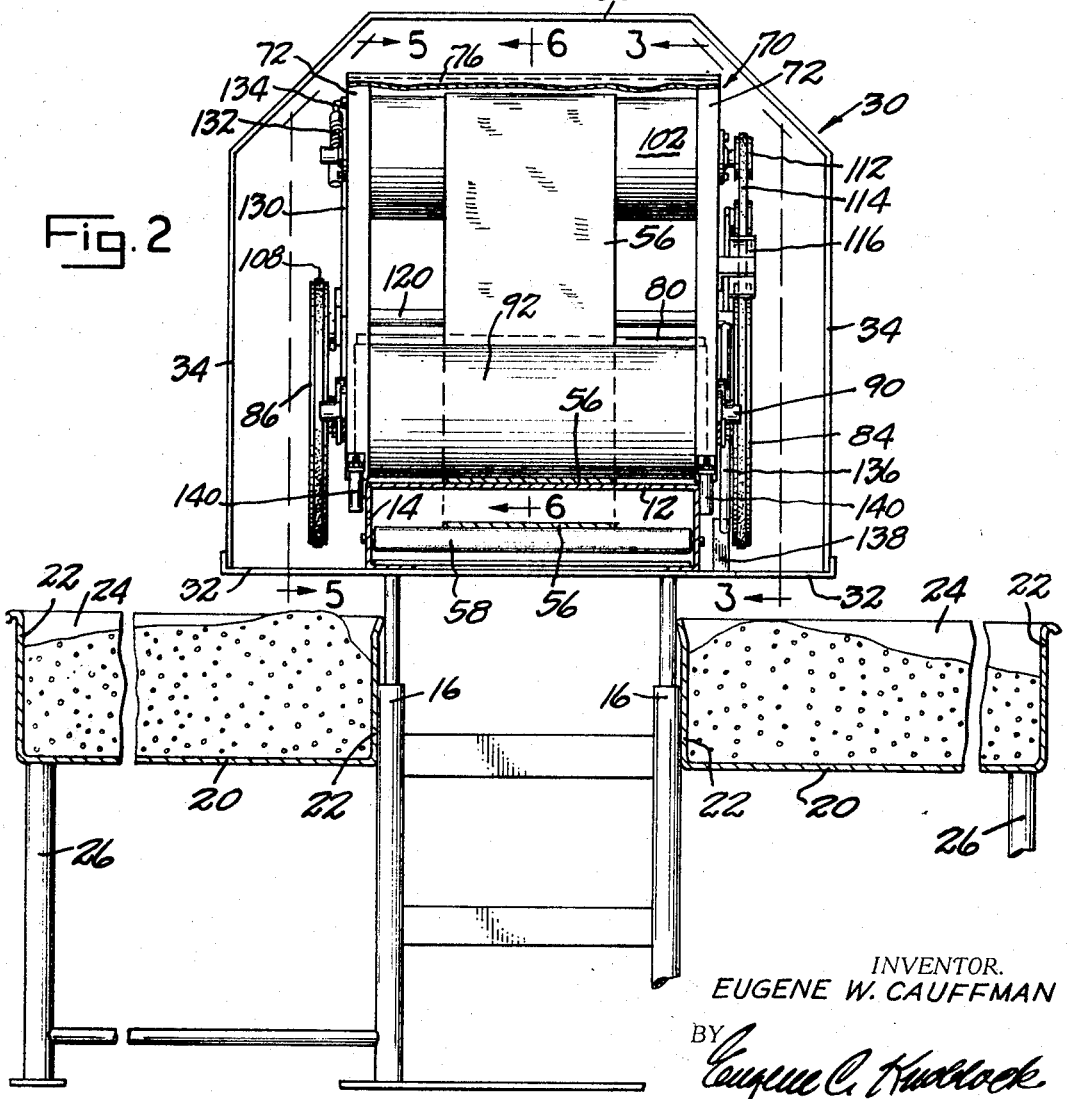
FIG. 2 is an enlarged transverse sectional view taken on line 2—2 of FIG. 1.

A bracket 50 is carried by and preferably projects longitudinally from the opposite end of the distributor table 10 and carries adjustable journal means 52 for rotatable support of a belt pulley 54 which is positioned at substantially the same elevation relative to the distributor table as is the driving belt pulley 44 at the opposite end of the distributor table. A conveyor belt 56 is trained around the belt pulleys 44 and 54 with its upper run supported upon and sliding upon the table top panel 12. A plurality of idler rollers 58 may be journaled to extend between the side panels 14 of the distributor table and support the lower run of the belt 56 as seen in FIG. 2. Belt 56 will preferably be substantially as wide as table 10, although it may be narrower than the table, as shown.

In the preferred form, the driving means 46—48 for the belt 56 are located remote from the end of the table at which material to be distributed is applied. At the feed end or supply end of table 10 are positioned upwardly directing longitudinal material confining side plates 60. A hopper 62 is positioned above the feeding end of the table between the plates 60 and at selected elevation relative to the distributor table top 12 and the belt 56 thereon, so as to control the rate of discharge of material therefrom. Alternatively, it will be understood that the hopper 62 may be provided with adjustable baffles or other means (not shown) for controlling the rate of discharge of material. Material storage means, such as a tank, storage bin or the like, has a discharge outlet 64 located above and discharging into the hopper 62, and will be provided with suitable closure means (not shown) as well understood in the art, to permit the discharge outlet 64 to be opened or closed at will.

A distributor drive unit or carrier 70 is mounted upon the distributor table 10 and is adapted to reciprocate or travel lengthwise thereon between selected limit positions for the purpose of moving a distributor member to deflect from the table top 10 and the belt 56 the material to be discharged along the length of the receiving means, such as the feed troughs or bunks 20, 22, 24. The distributor drive unit 70 includes a frame having side plates 72 which are fixedly interconnected in predetermined fixed relation, being spaced apart a distance slightly greater than the width of the belt 65 and table top 12. Any suitable means may be employed to fixedly interconnect the side plates 72, such as cross bars 74 and/or top and end closure plates 76. A shaft 78 is journaled in the side plates 72 and has splined or secured thereon a drive or traction roller 80 having a non-slip or friction tread 82, which bears upon the table top 12, as best seen in FIG. 6. Traction roller 80 is positioned substantially mid-length of the side plates 72 and preferably supports the side plates with their bottom edges at a level slightly above the level of the table top 12, as seen in FIG. 6. Drive shaft 78 mounts a pulley 84 in outboard relation to the right-hand side plate 72 as viewed in FIG. 2, which pulley 84 for purposes of convenience may be designated the out-drive pulley. The shaft 78 at its opposite end outboard of the other side plate 72 mounts a second pulley 86, which for purposes of convenience may be called the in-drive pulley.

A shaft 90 is suitably journaled in the side plates 72 at the lower portion thereof at the end nearest the hopper 62 and mounts thereon between plates 72 a roller 92 adapted to roll upon the upper surface of the belt 56. Roller 92 is an idler and functions as a stabilizing roller. A shaft 94 extends between the side plates 72 at the opposite ends thereof, being journaled thereto. Shaft 94 mounts a drive transmission roller 96, which may be referred to for convenience as an out-drive roller. The out-drive transmission roller 96 bears upon the top surface of the belt 56 and also serves the function of a stabilizing roller. The rollers 92 and 96 are positioned at such elevation that either thereof may assist the traction roller 80 to support the weight of the distributor drive unit, but the two rollers 92 and 96 preferably do not serve a weight supporting function simultaneously. The roller 96 preferably has a non-slip friction tread 98. A fourth shaft 100 is journaled by the side plates 72 spaced above the traction roller 80 and mounts an upper roller 102 which preferably has a non-slip friction tread 104 and which may be referred to for convenience as an in-drive roller. It will be observed from FIGS. 2 and 6 that the upper run of the belt 56 which is supported upon the top surface of the distributor top panel 12 is threaded through the distributor drive unit by passing under the rollers 92 and 96 and passing over and around the upper part of the upper roller 102. The belt is maintained taut for drive transmitting frictional engagement with the non-slip treads of both the out-drive roller 96 and the upper in-drive roller 102.

Shaft 94 has splined or otherwise secured thereto in outboard relation to the side plate 72 adjacent to the in-drive pulley 86 a pulley 106. A belt 108, which may be called an in-drive belt is trained around the pulleys 86 and 106, the same normally being slack upon said pulleys. One run of belt 108 is preferably positioned by a belt guide 110. A pulley 112 is splined or otherwise secured on the shaft 100 outboard of the side plate 72 adjacent to the out-drive pulley 84. An out-drive belt 114 is trained around the pulleys 84 and 112 and is slack thereon. Belt 114 may have a belt guide 116 associated therewith.

Figure 3:
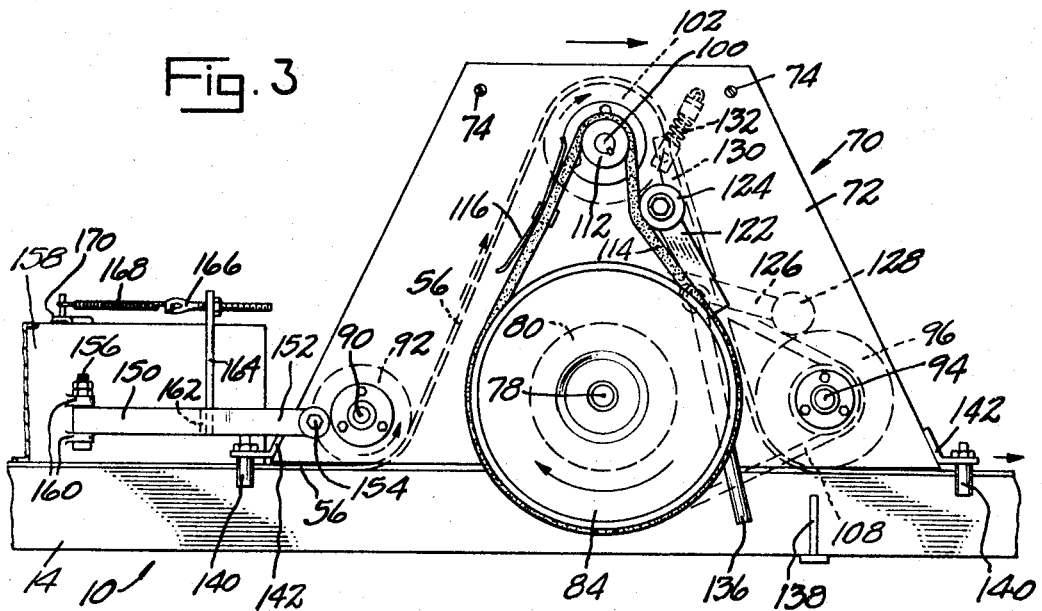
FIG. 3 is a side view of parts of the distributor as viewed in the direction of the arrows 3—3 of FIG. 2, and illustrating the arrangement of the driving parts while the distributor travels in the direction of the arrow.

A drive direction control or reversing means is carried by the distributor drive unit and cooperates with the belts 108 and 114 to tighten a selected one thereof to drive transmitting condition while the other is in idling condition. As here shown, this means includes a cross shaft 120 journaled to the side plates 72 mid-height thereof and adjacent the run of the belt 56 between the rollers 96 and 102. At the end of shaft 120 adjacent the side plate 72 alongside which the out-drive pulleys 84 and 112 are located and adjacent to a run of the out-drive belt 114 is fixedly mounted a lever arm 122 upon whose free end is journaled a belt-tightening idler pulley 124, engageable with the out-drive belt 114 in one position. The arm 122 is rocked by the shaft 120 between an out-drive belt-tightening position, as illustrated in FIG. 3, and an idling position illustrated in FIG. 4. At its opposite end, adjacent the in-drive pulleys 106 and 86, the cross shaft 120 mounts a lever arm 126 journalling upon its free end an idler pulley 128 which is engageable with a run of the belt 108 opposite the run engaging the belt guide 110. The parts are so arranged that when the out-drive idler 124 tightens the belt 114, the in-drive idler 128 is clear of the belt 108 and drive transmission occurs in the direction of the arrow in FIG. 3. Conversely, when the out-drive idler 124 is clear of the belt 114, the in-drive idler 128 is in belt-tightening contact with the belt 108, and a drive transmission occurs in the direction of the arrow in FIG. 4.

A toggle arm 130 is fixed to the shaft 120, preferably at the end which mounts the lever 126. Toggle arm 130 has a pivot connection with an elongated toggle spring assembly 132 including a compression spring, which assembly 132 is pivoted at 134 to the adjacent side plate 72 at the position which disaligns the spring assembly 132 with toggle arm 130 in each of the operative positions of the rock shaft 120 illustrated respectively in FIGS. 3 and 4. Also fixedly secured to the rock shaft 120 at one end thereof is a trip arm 136 projecting downwardly below the adjacent side plate 72. Alongside one side wall 14 of the table 10 are adjustably mounted trip members 138 located adjacent opposite ends of the distributor table at selected positions determined by the desired limits of travel of the distributor drive unit upon the table 10.

The out-drive arrangement of the parts is illustrated in FIG. 3, from which it will be seen that the rotation imparted to the upper out-drive roller 102 by the movement of the conveyor belt 56, coupled with the belt-tightening action on the out-drive belt 114 by the out-drive idler 124 causes a driving connection to be established between the out-drive roller 102 and the traction roller 80 which causes rotation of the roller 80 in a direction to move the distributing drive unit upon the table 10 in the same direction as movement of the conveyor belt 56. The driving ratio of the driving elements establishes the relative speeds of the conveyor belt 56 and the distributor drive unit such that the distributor drive unit moves along the table at a speed less than the speed of travel of conveyor belt 56.

Figure 4:
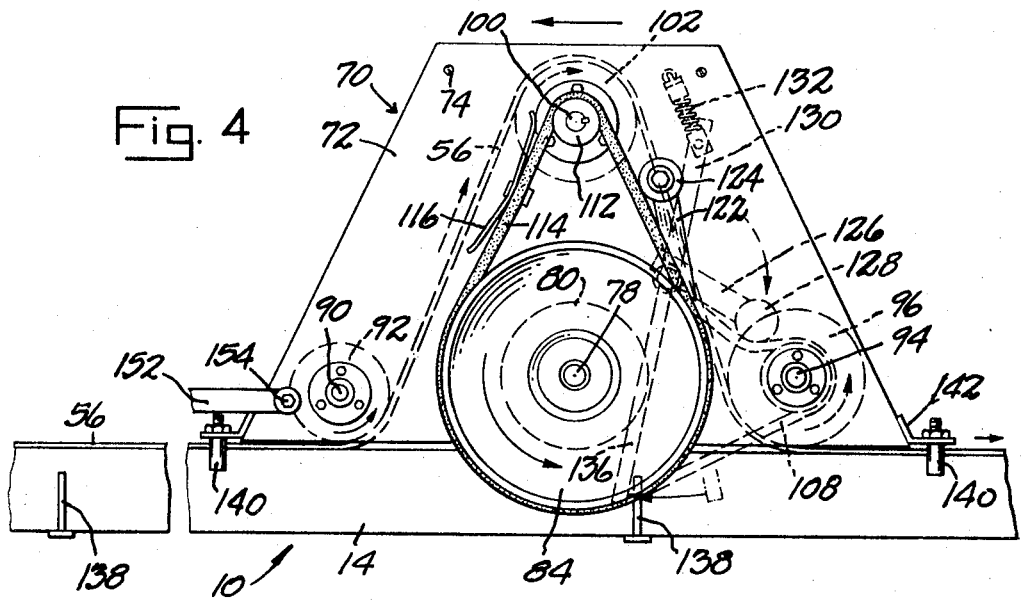
FIG. 4 is a view similar to FIG. 3, but illustrating the position of the driving parts when the direction of the travel has been reversed from that shown in FIG. 3.

When the distributor unit 70 reaches the outer end of its out-drive movement, as determined by the location of the trip member 138 remote from the hopper 62, the trip arm 136 engages said trip member 138 and causes rocking of the shaft 120 to produce an over-center swinging action of the toggle arm 130 and the toggle spring assembly 132, which produces a quick-throw of the toggle parts and associated parts to assume the position illustrated in FIG. 4. In the FIG. 4 position, the out-drive idler 124 is shifted clear of the belt 114 while the in-drive idler 128 is shifted into belt tightening engagement with the belt 108. Inasmuch as the direction of rotation of the in-drive roller 96 is opposite the direction of rotation of the upper out-drive roller 102 because the belt 56 passes under roller 96 and over roller 102, the tightening of the belt 108 causes a reversal of the direction in which the drive roller 80 is rotated. Thus, the distributor drive unit caused to traverse the table 10 in a direction toward the feed hopper 62, as seen in FIG. 4.

The speed ratio of the drive transmission parts 106, 108 and 86 may be different than the speed ratio of the parts 112, 114 and 84, and preferably will be such that a greater speed of the distribution drive unit 70 along the table top 10 will occur during in-drive movement counter to the direction of travel of the top run of conveyor belt 56 than occurs in the out-drive movement thereof, for purposes to be described.

The in-drive movement continues until the trip arm 136 engages the left hand trip member 138 as seen in FIG. 4, whereupon the toggle arm 130 and the toggle spring assembly 132 are shifted over-center by a quick-throw action to the FIG. 3 position, again reversing the direction of travel of the distributor drive unit to the out-drive direction illustrated in FIG. 3.

The drive or traction roller 80 supports the major portion of the weight of the distributor drive unit and the rollers 92 and 96 are positioned to serve as stabilizer rollers and to permit the frame of the distributor unit to tilt slightly about the shaft 78 as an axis, according to the stresses exerted thereon during operation. This rocking of the distributor unit requires the provision of guide means for the distributor unit which will accommodate such rocking action. I provide such guide means in the nature of upright rollers 140 journaled upon brackets 142 carried by each side plate 72 adjacent the lower part of each end thereof and each extending downwardly alongside a side wall 14 of the table, preferably with slight clearance. Thus the four corners of the distributor unit are provided with the rollers 140, and any tendency of the distributor unit to move in a direction at an angle to the table is corrected by the engagement of one or more of the rollers 140 with the table to insure that the path of travel of the distributor unit on the table will be substantially parallel to the table.

A material distributor is carried by the distributor drive unit 70 at the end thereof facing the hopper 62. The material distributor has a frame 150 which is preferably of substantially V-shape as seen in FIG. 7 and whose arms 152 are pivoted at 154 on aligned transverse axes to the lower corner portions of the side plates 72 of the distributor drive unit, so that said V-shape frame may pivot vertically relative to the distributor drive unit 70 and to the belt 56 and the table top. At its apex the V-shaped frame 150 has pivoted thereto by means of a vertical pivot pin 156 the central portion of a distributor plate 158 which is of a length greater than the width of the table 10 as seen in FIG. 7, when extending diagonally relative to the table to the extent limited by the frame 150. The V-shaped frame 150 preferably carries a transverse member 162 from the center of which extends upwardly a part 164 to which is secured adjustably a spring anchor 166 to which one end of a tension coil spring 168 is connected. The opposite end of coil spring 168 is connected to the free end of a forwardly projecting arm 170 at the center of the distributor plate 158. Adjustably mounted upon the table 10 adjacent each end of the path of travel of the distributor plate 158 and spaced from the trip members 138 are trip members 172 which are engageable by the blade 158 to trip the same shortly before the distributor drive member reaches the end of its stroke in either direction.

It will be observed from FIG. 7 that if the distributor member is moving toward the left, the leading end of the blade 158 will engage the left hand trip member 172 to swing the same about its pivot axis 156 until it reaches an over-center position, whereupon the tension of the spring 168 will swing the blade 158 to a diagonal position relative to the table 10 opposite that shown and parallel to or adjacent to the lowermost part of the V-frame 150 as viewed in FIG. 7. In this position, the blade 158 is prepared for travel on the return stroke toward the right as viewed in FIG. 7, being held in that position by the over-center spring 168 until the right hand trip member 172 is contacted by the blade 158 and the blade has been swung past center to permit the spring 168 to again come into play to return the distributor blade to the angular position illustrated in FIG. 7. By this means it will be apparent that while the distributor unit is in the adjustment shown in FIG. 7 and is moving toward the left, the material being carried by the conveyor belt 56 which is moving toward the right is deflected and discharged from the belt and the table 10 at the uppermost edge of the table 10. When the position of the distributor blade 158 has been reversed and its direction of travel has been reversed, assuming that the speed of travel of blade 158 is less than the speed of travel of conveyor belt 56, the material carried by the belt into engagement with the distributor plate 158 is deflected from the belt and the table in a downward direction, as viewed in FIG. 7.

It will be understood that in instances in which discharge of the material being distributed is to occur at one side only of the table, the distributor blade will be mounted at a selected diagonal position relative to the table and will not be subject to reversal. It is preferred in this instance, as well as in the reversible form illustrated, that the plate 158 shall be mounted to permit some vertical play or movement thereof to compensate for occurrence of tilting of the distributor drive unit frame parts 72 as previously mentioned and also to accommodate for irregularities of the belt, such as occur at belt lacings.

It will be apparent from the foregoing description that the operation of the conveyor belt in a predetermined direction serves to drive the distributor drive means in a reciprocating path of travel, with one stroke of the reciprocation in the same direction as the movement of the conveyor run of the belt and the other stroke of the reciprocation in a direction opposite to the direction of travel of the conveyor run of the belt. Also, by controlling the size relation of pulley 112 to roller 102 and pulley 84, and the size relation of pulley 106 to roller 96 and pulley 86, selected speeds of travel of the distributor unit along the table can be provided, so as to move the distributor 158 slower than the movement of the belt 56 when moving in the same direction as the belt and to cause a more rapid traversal of the table 10 by the distributor 158 when moving counter to the direction of movement of the belt. All of these advantages are accomplished by simple belt-pulley drives, and the rotation of the traction roller 80 engaging the table advances the distributor at selected speed in each of the two directions of rotation of roller 80. By selection of the speeds of the distributor in each of the two directions with the speed of the conveyor belt 56, it is possible to insure in the device equal discharge of material at the two receiving means or troughs 20–24 at the opposite sides of the table.

Other advantages of the device include simplicity of construction, ready accessibility for repair or replacement of parts, elimination of a separate power member for driving the distributor as distinguished from the conveyor belt, safety of operation, protection of livestock from moving parts of the device, and minimizing of interference with desired distribution of material in out-of-doors locations. Ready adjustment of the stroke or path of travel of the distributor, in the event travel full length of a table is not required or desired, can be accomplished by changing the location of trip members, such as members 138 and 172. Ready disassembly of the distributor drive unit from the table can be accomplished by separating the belt at a lacing thereof, releasing the belt from the drive unit, and lifting the distributor drive unit 70 and its distributor plate 158 from the table 10, as for the purpose of facilitating repair or replacing parts.

An alternate embodiment of propulsion means for the distributor unit is illustrated in FIGS. 8 and 9. In this construction, parts similar to those described herein previously bear the same reference numerals. The distributor table 10 is characterized by two spaced sections each having a downturned inner flange 180 extending lengthwise theerof, with the sections being rigidly interconnected by transverse plates 182 welded thereto at longitudinally spaced points and each having a central notch therein at 184. At one end of the table, preferably adjacent the driven belt pulley 54, the table supports an anchor 186 for a cable 188 whose opposite end is connected to a tensioned coil spring 190 anchored to the table at 192.

The distributor drive unit journals the drive shaft 78 and the secondary shafts 90, 94 and 100. The secondary shafts mount the rollers 92, 96 and 102 respectively, as in the previously described embodiment, which have threaded thereon the upper run of the drive belt 56 trained around the pulleys 44 and 54 as previously described. In this embodiment, the drive shaft 78 has journaled thereon supporting rollers 194. At opposite ends thereof the rollers 194 engage the table top 10 and serve to support the weight of the distributor drive unit 70, but the journaling thereof upon the shaft 78 permits rotation of shaft 78 and the rollers 194 at different speeds. The shaft 78 has splined or otherwise secured thereto a sheave 196 which preferably is of larger diameter than the rollers 194 and which extends into the space or notch 184 between the downturned table flanges 180. Cable 188 is trained around the sheave 196 and is tensioned therearound by the spring 190. In practice, the spring 190 may exert a tension in the order of 200 pounds, although it will be understood that this amount of tension is illustrative and is not intended to be limiting.

In the operation of this modified embodiment of the invention, rotation imparted to the shaft 78 is in turn imparted to the sheave 196 and causes propulsion of the distributor drive unit 70 by reason of the taut friction drive engagement between the sheave 196 and the cable 188 trained therearound. This drive unit is particularly well suited at locations in which the presence of moisture or other adverse conditions would tend to cause slippage of traction roller 80 of the previously described embodiment.

Another modified embodiment of the invention entails the use of squirrel-cage belt rollers, such as the secondary rollers 92, 96 and 102. It has been found in some instances that material fed by the device, such as ensilage or other feed material, tends to deposit sap or other moisture of adhesive character upon the conveyor belt to which dust and particles adhere so that a coating layer is formed on the belt, which layer is firmly pressed on the belt by the pressure of the rollers as the belt passes under rollers 92 and 96.

A squirrel-cage roller construction, such as illustrated in FIG. 10 is useful in breaking up such a coating layer and in providing proper guided travel of the belt upon the rollers. This squirrel cage construction has a central tubular or solid hub or shaft portion 200 which mounts a pair of end disks 202 and one or more intervening disks 204. The disks 202 and 204 are preferably substantially uniformly spaced and are spaced concentrically. Bars 204 are welded or otherwise secured to the disks 202 and 204 in substantially similar uniformly circumferentially spaced relation. Thus, the bars may be welded to the edges of the intervening disks 204 and may be anchored in any desired manner to the end disks 202 spaced from the periphery of the end disks. The bars 206 extend at an angle to the axis of the central tube or shaft 200 to provide a long helical lead thereof relative to the axis of the squirrel cage roller. The bars may be positioned in substantially equally spaced relation to the roller axis throughout their length as shown in FIG. 8, or may be bent to provide greater spacing of the central portion from the roller axis than the spacing of the end portions thereof from the roller axis.

The use of squirrel cage rollers upon the shafts 90, 94 and 100 provides for drive transmission between the belt 56 and the roller. In addition, it provides engagement between the belt and the roller characterized by impact of the bars 206 upon the belt successively at short intervals. This impact has been found to be effective for the purpose of preventing or breaking adhered accumulation or layers upon the belt during use.

Various types of means for reversing the direction of travel of the drive of the distributor unit may be provided. Thus, one alternative embodiment of drive for the device is illustrated in FIG. 11. In this construction, the distributor unit 70 mounts a liquid reservoir or sump 220 which is connected by conduit 222 to a pump 224 mounted on the shaft of one of the secondary rollers, here shown as roller 102. Conduit 226 delivers liquid from pump 224 to the reversible valve 228 from which conduits 230 and 232 extend to a hydraulic motor 234 mounted upon the drive shaft 78. Conduit 236 connects the outlet of the motor 234 with the reservoir 220. Valve 228 is provided with an elongated actuating arm 238 having its lower end positioned to engage the trip members 138 previously described. The upper end of the arm 238 projects beyond valve 228 and is connected to a quick-throw mechanism including a coil spring 240 pivoted at its opposite end to a side plate 72 of the distributor drive unit 70. The parts are so proportioned and positioned that the valve actuating arm 238 has two opposite positions determined by the quick-throw spring 240 and serving to control the setting of the valve 228 to direct flow there-through from conduit 226 to a selected one of the conduits 230 and 232, thereby controlling the direction of rotation of the hydraulic motor 234.

It will be observed in this embodiment that the rotation of the roller 102 produced by the travel of the belt 56 provides the means for effecting ultimate reciprocating drive of the propulsion shaft 78. Thus, the same advantage of deriving power to propel the distributor drive unit 70 in a reciprocating path from the unidirectional movement of the distributor belt 56 is utilized in this construction as in the previously described construction.

Another embodiment of drive means for driving a distributor drive unit in a reciprocating path upon a table from power derived from the distributor belt is illustrated in FIGS. 12 and 12a. In this connection, one of the secondary roller shafts, here shown as the shaft 100, mounts a sprocket 250 around which is trained a chain 252 which in turn is trained around a sprocket 254 carried by a shaft 256 mounted upon the distributor unit side plate 72 on one side thereof. Shaft 256 may be journaled on plate 72 or it may be a fixed stub shaft upon which the sprocket 254 is journaled.

The drive shaft 78 fixedly mounts a sprocket 258 and also serves to journal the elongated portion 260 of a T-shaped member having a laterally enlarged upper portion 262 and a downwardly projecting trip portion 264. The T-shaped member has two operative positions illustrated in FIGS. 12 and 12a respectively, and has associated therewith quick-throw mechanism including coil spring 266 pivoted to the center of the upper part 262 and also pivoted to the distributor 70 at a side plate. The part 262 of the T member journals a pair of laterally spaced pinions 268. A chain 270 is trained around the sprocket 258, and each of the laterally spaced pinions 268 has fixedly associated therewith a sprocket 272.

The sprockets 272 are positioned on opposite sides of one run 253 of the chain 252 in a plane common thereto. The arrangement of the parts is such that in one operative position of the T-shaped member 260, as illustrated in FIG. 12, one of the sprockets 272 will engage and mesh with the run 253 of the chain 252 so as to cause travel of the chain 270 in one direction, such as a direction producing a counterclockwise rotation of shaft 78, as seen in FIG. 12. The opposite setting of the T-shaped member 260, as seen in FIG. 12a, brings the other sprocket 272 into engagement with the chain 270 in a direction to produce clockwise rotation of the shaft 78. Engagement of the trip portion 264 with trip members 138 at opposite ends of the path of reciprocation of the drive unit reverses the setting of the member 260 with a snap action.

I claim:
1. A material distributing device comprising:
   an elongated table,
   a distributor unit reciprocable on said table and including a frame journaling a drive shaft of a unit propelling means and a set of secondary rollers,
   a power driven conveyor including a belt having a run supported and traveling lengthwise on said table and threaded on said set of secondary rollers to rotate said secondary rollers, a first secondary roller being rotated in one direction and a second secondary roller being rotated in an opposite direction, and
   means having two positions and operable in one position for establishing a drive-transmitting connection of said drive shaft with said first secondary roller to propel said distributor unit on said table in one direction and operable in the other position for establishing drive-transmitting connection of said drive shaft with said second secondary roller to propel said distributor unit on said table in the opposite direction.

2. A material distributing device as defined in claim 1, and:
means carried by said table at spaced points and engaged by said two-position means for reversing the position of the latter means.

3. A material distributing device as defined in claim 1, wherein:
said two-position means includes a normally inoperative belt-drive between each of said first and second secondary rollers and said drive shaft and oppositely operative belt-tensioning means.

4. A material distributing device as defined in claim 1, wherein:
said distributor unit propelling means includes a traction roller journaled intermediate the length of said frame, and said secondary rollers include a pair of low-level rollers at opposite sides of said traction roller under which said belt is trained and a high-level roller over which said belt is trained.

5. A material distributing device as defined in claim 1, wherein:
said two-position means includes a normally inoperative belt-drive between each of said first and second secondary rollers and said drive shaft, and a rockable shaft mounting a pair of belt-tighteners oppositely oriented for engagement with one of said last named belt drives in one operative position and clear thereof in the other position.

6. A material distributing device as defined in claim 1, wherein:
the drive-transmitting connection between said first secondary roller and said drive shaft produces a different rotative speed of said drive shaft than the drive connection between said second secondary roller and said drive shaft.

7. A material distributing device as defined in claim 1, wherein:
said two-position means includes a quick-throw mechanism, and said table mounts spaced means engageable by said quick-throw mechanism at opposite ends of the path of travel of said distributor.

8. A material distributing device as defined in claim 1, wherein:
said two-position means is pivoted on said frame and includes a toggle arm and spring means pivoted to said frame and to the free end of the toggle arm to complete a toggle assembly urging said toggle arm to one of two limit positions when said arm is moved in either direction past alignment thereof with pivots of said toggle arm and said spring means.

9. A material distributing device as defined in claim 1, and:
guide rollers carried by said distributor unit and engageable with said table.

10. A material distributing device as defined in claim 1, and:
a distributor plate pivoted centrally thereof about a substantially vertical axis to said distributor unit frame for deflecting laterally from said table material being conveyed by said belt, and
means reversing the angular position of said plate relative to said belt and said table.

11. A material distributing device as defined in claim 1, and:
a distributor plate pivoted centrally thereof about a substantially vertical axis to said distributor unit frame and having two opposed operative positions oblique of said belt for selectively deflecting laterally from said table material being conveyed by said belt, and
means responsive to the direction of travel of said distributor unit for controlling the position in which said plate is set.

12. A material distributing device comprising an elongated table:
a power driven conveyor including a belt having a run supported on said table,
a distributor carrier reciprocable on said table parallel to said belt,
means actuated by movement of said belt for moving said distributor in a reciprocating path of travel parallel to said belt run and between selected limit positions, and
a plate pivoted centrally thereof about a substantially vertical axis to said carrier for deflecting in a selected lateral direction material being conveyed by said belt.

13. A material distributing device as defined in claim 12, and:
an elongated cover carried by said table and spaced laterally and vertically therefrom to define a passageway in which said distributor unit travels, said cover having spaced longitudinal sides which extend below the plane of the table supported run of said belt.

14. A material distributing device as defined in claim 12, and:
quick-throw means for reversing the deflecting position of said plate incident to each reversal of the direction of movement of said carrier.

15. A material distributing device as defined in claim 12, wherein:
said plate engages said belt and is mounted to swing relative to said carrier on a transverse axis to accommodate vertical movement of said plate and thereby compensate for surface irregularities of said belt.

16. A material distributing device comprising:
an elongated table,
a power driven conveyor including a belt having a run supported on said table,
a distributor unit supported and movable on said table and including means engaging said table supported run of said belt for deflecting laterally from said belt run and off said table material being conveyed by said belt, and
means actuated by movement of said belt for moving said distributor unit parallel to said belt run between selected limit positions.

17. A material distributing device as defined in claim 16, wherein:
said distributor moving means includes means for moving said unit along said table at one speed in one direction and means for moving said unit at a second speed in the other direction.

18. A material distributing device as defined in claim 16, wherein:
said distributor moving means includes means for moving said unit along said table at a speed slower than the speed of and in the same direction as the movement of said table supported belt run and means for moving said unit at a faster speed in the direction counter to the direction of travel of said table-supported belt run.

19. A material distributing device as defined in claim 16, wherein:
said distributor moving means includes a reversible drive shaft, means for reversing rotation of said shaft, a drive transmitting member carried by said shaft and a stationary member carried by and extending longitudinally of said table and engaged by said drive transmitting member.

20. A material distributing device as defined in claim 16, wherein:
said distributor moving means includes a reversible drive shaft, means for reversing rotation of said shaft, a drive transmitting member carried by said shaft, and an elongated flexible member having ends anchored at opposite ends of said table and having an intermediate portion trained in drive transmitting relation about said drive transmission member.

21. A material distributing device as defined in claim 16, wherein:

said distributor moving means includes a hydraulic system including a pump driven by movement of said belt, a reversible hydraulic propulsion motor, a circuit connecting said pump and motor, a reversing valve in said circuit for controlling the direction of flow to and operation of said motor, and means for reversing the valve at selected positions of said distributor unit upon said table.

22. A material distributing device as defined in claim 16, wherein:

said distributor moving means includes a chain driven in response to operation of said belt, a two-position carrier having a second chain trained thereon and rotating a unit-propelling shaft, a pair of spaced sprocket assemblies on said carrier, each assembly having a constant driving connection with said second chain and having a driving connection with said first chain in one of the two operative positions of said carrier, and means for changing the position of said distributor upon said table.

23. In combination:

an elongated table having a top, a conveyor including a power driven belt having an upper run traversing said table top, a distributor unit traversing said table and including a pair of first rollers and a second roller between said first rollers, said belt passing under said first rollers and over said second roller, at least one of said first rollers forming a support for said distributor, and means responsive to the movement of said belt for advancing said distributor along said table in a reciprocating path between predetermined limit positions.

References Cited

UNITED STATES PATENTS

| 1,375,704 | 4/1921 | Kendall | 198—186 |
| 1,714,032 | 5/1929 | Liggett | 198—186 |
| 3,297,147 | 1/1967 | Sackett | 198—230 |
| 3,306,261 | 2/1967 | Purdy | 198—185 X |

EDWARD A. SROKA, *Primary Examiner.*

U.S. Cl. X.R.

119—56